Sept. 3, 1946.   C. W. WALZ ET AL   2,406,976
BEET LOADER
Filed June 26, 1944
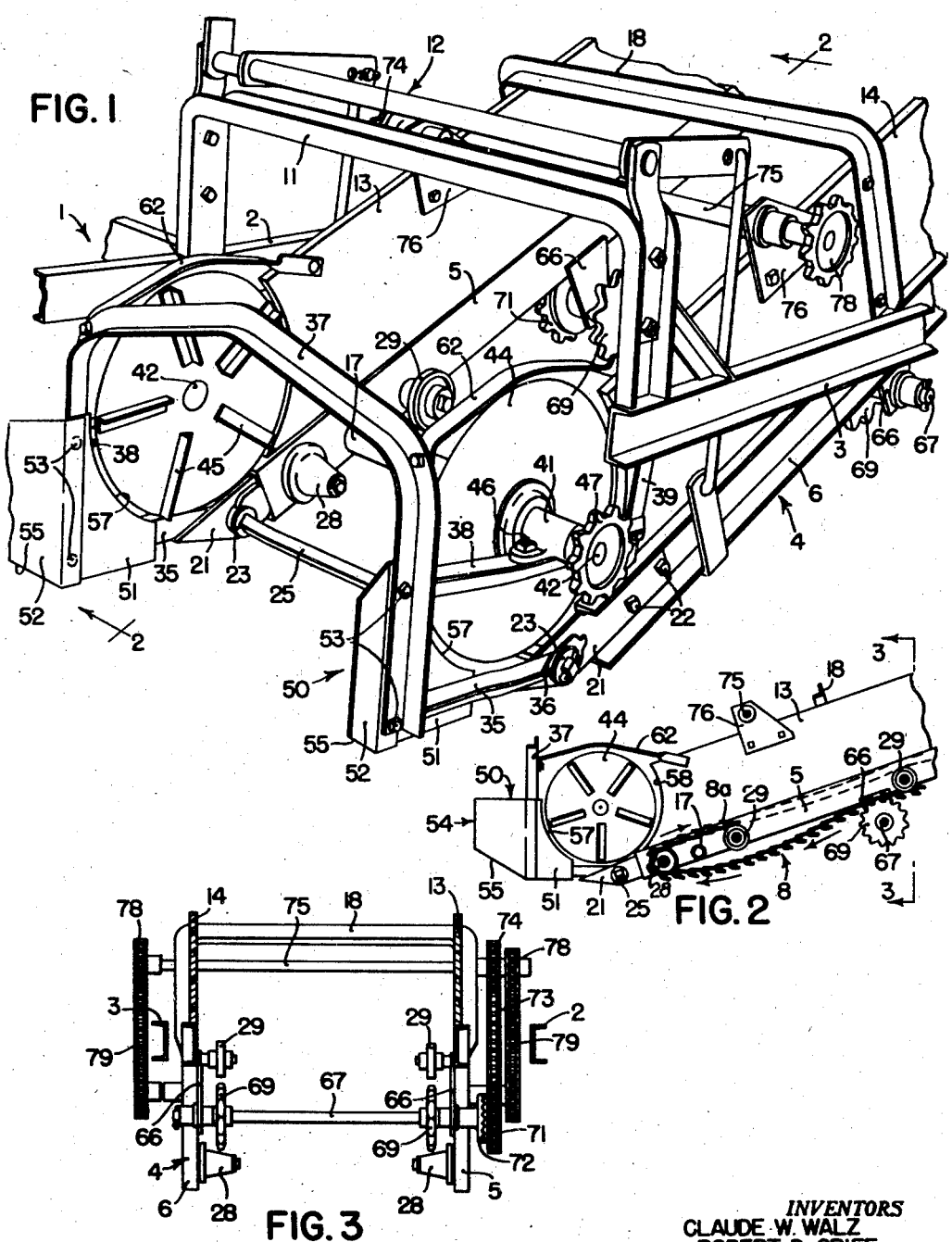
INVENTORS
CLAUDE W. WALZ
ROBERT D. GRIFF
ATTORNEYS Patented Sept. 3, 1946

2,406,976

UNITED STATES PATENT OFFICE 2,406,976

BEET LOADER

Claude W. Walz and Robert D. Griff, Rock Island, Ill., assignors to Deere & Company, Moline, Ill., a corporation of Illinois Application June 26, 1944, Serial No. 542,154

7 Claims. (Cl. 198—9)

The present invention relates generally to loaders for agricultural crops and more particularly is concerned with loaders for root crops and the like, such as sugar beets, potatoes, etc.

The object and general nature of the present invention is the provision of new and improved means for guiding the crop onto the elevator. The machine of the present invention is especially adapted for gathering sugar beets from a windrow. It is the present practice when harvesting sugar beets to deposit the beets from several rows into a windrow at the time the beets are pulled and topped. Usually, a narrow strip is cleared across the field to receive the windrowed beets so as to facilitate their subsequent loading into trucks or wagons for transport to the mill. In clearing such a strip, trash and the like is usually pushed to one side so that the beets at the bottom of the windrow rest directly on the ground.

Quite a number of attempts have been made to produce a mechanical loader that would pass down the windrow and gather all of the beets from the windrow onto an elevator from which they would be deposited into an adjoining truck or wagon, but generally such loaders either do not gather all of the beets or they bring in excessive quantities of trash which upon delivery to the mill materially reduces the market value of the beets.

It is, therefore, an important feature of this invention to provide a loader which is especially constructed to guide all of the beets from the windrow into the elevator and which is provided with rotatable members for facilitating the movement of the beets, especially those at the side of the windrow, into the elevator but without picking up trash and the like. Specifically, it is an important feature of this invention to provide a loader having at its forward end a pair of stationary guides which are effective to guide the beets toward the elevator but to push trash to one side, in conjunction with a pair of rotatable disks disposed rearwardly of the stationary guides but substantially in the plane thereof, for moving the beets at the side of the windrow substantially directly into the elevator. Normally no trouble is experienced in having the beets in the center of the windrow move readily into the elevator, but sometimes the beets at the sides of the windrow tend to lodge or bridge at the sides and to restrict the even flow of the beets from the windrow into the elevator. According to the principles of the present invention, rotatable disks are driven in such a way as to keep the beets at the sides of the windrow moving uniformly into the elevator but the rotatable beet-feeding means is protected by the stationary guides forward thereof from gathering in trash and the like at the same time, which is highly objectionable.

Another important feature of this invention is the provision of improved driving means for rotating the disks, which driving means derives its operating energy directly from the elevator chain, specifically, from the lower run thereof, and it is an additional feature of the present invention to provide a drive for the disks which is elevated and out of the way of trash and the like so that there is little tendency for trash to get caught on the disk driving mechanism.

These and other objects and advantages of the present invention will be apparent to those skilled in the art after a consideration of the following detailed description, taken in conjunction with the accompanying drawing.

In the drawing:

Figure 1 is a perspective view of the front portion of a beet loader in which the principles of the present invention have been incorporated.

Figure 2 is a sectional view at a smaller scale, taken generally along the line 2—2 of Figure 1.

Figure 3 is a sectional view, at a somewhat larger scale, taken generally along the line 3—3 of Figure 2.

Referring now more particularly to Figure 1, the beet loader is somewhat similar to that disclosed and claimed in the co-pending application filed by ourselves and Clarence T. Rasmussen, Serial No. 456,459, filed August 26, 1942, to which reference may be made if necessary. Briefly, the beet loader, only a part of which has been shown in Figure 1, comprises a wheel supported framework 1 which includes longitudinal frame members 2 and 3 and a vertically swingable framework 4, including downwardly and forwardly extending bars 5 and 6. The framework 4 forms a support for an elevating chain 8 which is commonly referred to as a potato chain since the links thereof correspond to the links of a potato chain. The main frame bars 2 and 3 are rigidly connected together by a U-shaped yoke member 11 on which a part of the mechanism, indicated at 12, for raising and lowering the front end of the framework 4 is mounted. The side bars 5 and 6 of the elevator framework 4 include vertical parallel side members 13 and 14, such parts being connected together by transverse pipe members 17 and yokes 18 formed of angle stock or other suitable shapes. At the front end of each of the elevator frame channels 5 and 6, is a bearing shoe 21 bolted, as at 22, to the associated channel and having an opening adjacent its forward end to receive a rotatable bearing member 23. The bearing members 23 rotatably support a transverse rod 25 which is polygonal in cross section, preferably square, similar to a rod weeder rod. The shoes 21 are adapted to penetrate the ground a short distance so that the rod 25 normally operates at the ground surface and, during rotation, acts to raise the beets and deliver them onto the lower end of the elevator chain 8. The elevator chain 8 is supported at its lower end on a pair of conical rollers 28 and the upper run 8a of the elevator chain is supported intermediate its ends on a plurality of idlers 29 that are carried in a suitable bearing means on the elevator chain channels. The rod 25 is driven by any suitable means, and likewise the elevator chain 8 is driven by any suitable means, preferably from its upper end (not shown).

In operation the loader is driven along the windrow so that the rod 25 operates substantially at or just underneath the ground level and as the machine moves down the windrow the beets are directed onto the elevator chain 8. The present invention is particularly concerned with the means for guiding the beets from the windrow onto the elevator, and such mechanism will now be described.

A lower angle 35 is bolted, as at 36, to each of the shoes 21 and at its outer end is welded or otherwise fixed to the lower portion of a U-shaped yoke 37 which normally extends from one side of the loader to the other. At each side of the loader there is also a second brace member 38 which is fixed at its forward end to the yoke 37 and at its rear end to a reenforcing strap 39 carried by the front end of the side plate, 13 or 14, associated therewith. The upper angle 38 forms a support for a journal box 41 in which a shaft 42 is mounted for rotation. The inner end of each of the shafts has fixed thereto a disk 44 the inner face of which carries a plurality of angle lugs 45. The bearing member 41 is bolted, as at 46, to the upper angle 38 in such a position thereon that the associated disk 44 is above and slightly forward of the rod 25, as best shown in Figure 1. The outer end of each disk shaft 42 has fixed thereto a sprocket 47. Secured to the forward ends of each of the pairs of angles 35, 38, is a stationary guide member 50 comprising two plates 51 and 52, both secured to the front flange of the yoke angle 37 by means of bolts 53. The forward section 52 of the stationary guide member 50 is extended or flared out forwardly and has a lower edge 55 which extends forwardly and upwardly. The plate section 51 is provided with an arcuate rear edge, as indicated at 57, and each plate 51 and its associated disk 44 are mounted in the same plane, namely, the plane of the associated side member, 13 or 14, of the elevator. It will be seen, particularly from Figure 2, that the front end of each side member 13 and 14 is arcuate, as at 58, so as to conform generally to the periphery of the associated disk 44. A bar 62 is fastened to each side member and, at its forward end, to the vertical flange of the front yoke 37 so as to overlie the disks 44 and serve as a protecting member therefor.

The mechanism for driving the disks 44 will now be described. As best shown in Figures 1 and 2, a bracket 66 is fixed, as by welding, to the inner face of each of the conveyor frame channels 5 and 6, and these brackets carry suitable bearings supporting a cross shaft 67. Fixed to the cross shaft 67 adjacent the brackets 66 is a pair of sprockets 69, these sprockets being disposed in the plane of the idlers 29 adjacent thereto, as best shown in Figure 3. The shaft 67 is extended outwardly beyond the side member 13 and drives a sprocket 71 through a slip clutch structure 72. Trained over the sprocket 71 is a chain 73 which at its upper end passes over a sprocket 74 that is fixed to the right end of an upper cross shaft 75. The latter shaft is supported on the side members 13 and 14 by means of bearing brackets 76. A sprocket 78 is fixed to each end of the upper cross shaft 75 and receives a chain 79 that extends downwardly therefrom and also forwardly and at its lower end is trained around the sprocket 47 on the associated disk shaft 42. As will be seen from Figure 2, the sprockets 69 are placed underneath the lower run of the elevator chain 8, the lower run moving downwardly and forwardly in the direction of the arrow in Figure 2, which rotates the sprockets 69 and the shaft 67 in a counterclockwise direction. The shaft 67 is so mounted that not only are the sprockets 69 adjacent the associated idlers 29 but, in addition, the sprockets 69 are disposed vertically in a position such that the idlers 29 serve to hold the lower run of the elevator chain 8 in mesh with the sprocket 69, preventing the chain from jumping out of the sprocket in operation. This is a very desirable feature since, it will be remembered, the elevator chain 8 is driven from its upper end and therefore its lower run tends at all times to be slack. Hence, the provision of some means for insuring that the slack lower run of the elevator chain remains in mesh with the sprockets 69 is desirable. Having the driving chains 79 extend downwardly toward the sprockets 47 on the disk shafts has the advantage that the disk driving means is thus up above the trash, weeds, and the like, and is thus protected. If desired, of course, shields may be disposed over the chains 79 and 73.

In operation, the raising and lowering mechanism 12 is operated to lower the front end of the elevator unit 4 until the rod 25 operates at or adjacent the ground level. The outfit is then driven along a window of beets, the stationary guide shields 51, 52, serving to guide the windrowed beets into the loader. The positive drive of the disks 44 insures that there will be no tendency for the beets to pile up in the lower corners of the throat of the loader. The stationary trash shields 52 serve to guide the beets at the sides of the windrow into the machine but pass over the substantial portion of trash, such as foliage, stones and the like, and hence the shields 52 do not serve to guide such material into the machine. Also, the rotation of the disks 44 tends to prevent the beets from bridging across the front of the elevator and thus keeps them moving into the elevator in a uniform manner as the machine is driven down the windrow.

While we have shown and described above the preferred structure in which the principles of the present invention have been incorporated, it is to be understood that our invention is not to be limited to the particular details shown and described above, but that, in fact, widely different means may be employed in the broader aspects of our invention.

What we claim, therefore, and desire to secure by Letters Patent is:

1. In a crop loader, a conveyor comprising a framework having sides and an elevating element constituting the bottom thereof, forwardly disposed extensions carried at the front of said framework, stationary guides fixed to said extensions, and a pair of driven disks disposed between the sides of said conveyor and said stationary guide members and also mounted on said extensions, each of said disks being disposed in the plane of the front of the associated frame side and the rear portion of the associated extension, the space between said disks above said elevating element being substantially unobstructed.

2. In a crop loader, a downwardly and forwardly extending supporting framework, an endless elevating chain supported for movement in an upwardly and rearwardly extending direction by said framework, a pair of rotary disks supported at each side of said framework adjacent the forward end thereof for directing material onto said elevating chain, sprockets supporting the lower run of said chain, and means driven from said sprockets for driving said disks.

3. A crop loader comprising a downwardly and forwardly extending framework, an elevating chain of the endless type movably carried by said framework and moving upwardly along its upper run and downwardly along its lower run, side members supported by said framework, a pair of rotary disks disposed substantially in the plane of and at the forward end of said side members for moving material from in front of said chain over onto said chain, a cross shaft supported upwardly and rearwardly of said disks on said side members, means extending generally downwardly from said cross shaft to both of said disks for revolving them, and means driven from said elevator chain and extending upwardly to said cross shaft for driving the latter.

4. A crop loader comprising a downwardly and forwardly extending framework, an elevating chain supported for movement thereon and including an upwardly moving upper run and a downwardly moving lower run, side members carried by said framework, a pair of rotatable disks, means for mounting said disks on said framework at the forward ends of said side members, a cross shaft supported by said framework at the lower side of said elevating chain and including a pair of sprockets over which the lower run of said chain is trained, and means connected between said shaft and said disks for rotating the latter by power derived from the movement of the lower run of said elevating chain.

5. The invention set forth in claim 4, further characterized by said lower run of the elevator chain passing over the upper portions of the sprockets on said cross shaft, and an idler roller carried at each side of said framework between said upper and lower runs for supporting the upper run and for holding the lower run of said elevating chain in mesh with said sprockets.

6. In a crop loader, a downwardly and forwardly extending supporting framework, a rotatable rod carried in a transverse position by the forward position of said framework and adapted to pass under the crop and direct it generally upwardly and rearwardly as the loader is drawn along the piled crop, forwardly diverging stationary guide members carried at the front of said framework for guiding the crop toward said rod, the rear narrower spaced ends of said guide members being disposed forwardly of said rod, a pair of rotatable disks mounted generally above and forward of said rod and generally in the plane of and rearwardly of said rear ends of said stationary guide members for aiding the passage of the crop over and rearwardly of said rod.

7. In a crop loader, a downwardly and forwardly extending supporting framework, a downwardly and forwardly extending elevator carried thereby, a rotatable crop engaging part carried in a transverse position by said framework immediately forward of the lower end of said elevator, said rotatable part being adapted to pass under the crop and direct it generally upwardly and rearwardly onto said elevator as the loader is drawn along the piled crop, forwardly diverging stationary guide members carried at the front of said framework for guiding the crop toward said part, a pair of rotatable disks mounted generally above and forward of said part and generally in the plane of and rearwardly of said rear ends of said stationary guide members for aiding the passage of the crop over and rearwardly of said part and onto said elevator.

CLAUDE W. WALZ.
ROBERT D. GRIFF.